US012732699B2

(12) United States Patent
Kishida

(10) Patent No.: US 12,732,699 B2
(45) Date of Patent: Sep. 8, 2026

(54) IMAGING APPARATUS AND METHOD FOR CONTROLLING IMAGING APPARATUS INCLUDING LIMITED RANGE DETERMINATION

(71) Applicant: Panasonic Intellectual Property Management Co., Ltd., Osaka (JP)

(72) Inventor: Naotaka Kishida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 167 days.

(21) Appl. No.: 18/810,584

(22) Filed: Aug. 21, 2024

(65) Prior Publication Data

US 2025/0080850 A1 Mar. 6, 2025

(30) Foreign Application Priority Data

Sep. 5, 2023 (JP) ................................ 2023-143983

(51) Int. Cl.

| | |
|---|---|
| ***H04N 5/335*** | (2011.01) |
| ***H04N 5/91*** | (2006.01) |
| ***H04N 23/55*** | (2023.01) |
| ***H04N 23/63*** | (2023.01) |
| ***H04N 23/69*** | (2023.01) |

(52) U.S. Cl.

CPC ............... *H04N 23/69* (2023.01); *H04N 5/91* (2013.01); *H04N 23/55* (2023.01); *H04N 23/634* (2023.01)

(58) Field of Classification Search

CPC ............................ H04N 23/69; H04N 23/634

See application file for complete search history.

(56) References Cited

U.S. PATENT DOCUMENTS

| | | | | |
|---|---|---|---|---|
| 8,682,152 | B2 * | 3/2014 | Kishida | G02B 7/102 396/71 |
| 2010/0026848 | A1 | 2/2010 | Kakehi | |

(Continued)

FOREIGN PATENT DOCUMENTS

| | | | |
|---|---|---|---|
| JP | 2000-122147 | A | 4/2000 |
| JP | 2000-231149 | A | 8/2000 |
| JP | 2005-101729 | A | 4/2005 |

(Continued)

OTHER PUBLICATIONS

Japanese Office Action dated Nov. 7, 2023 issued on the corresponding JP Patent Appln. No. 2023-143983.

*Primary Examiner* — Gary C Vieaux

(74) *Attorney, Agent, or Firm* — Renner, Otto, Boisselle & Sklar, LLP

(57) ABSTRACT

An imaging apparatus of the present disclosure comprises: a processor; a memory storing instructions to be executed by the processor; a camera body including an imaging element and a display panel; and an interchangeable lens including a lens, a zoom ring that varies position of the lens, and a zoom encoder that detects information on zoom position of the zoom ring; the instructions including: determining whether the teleconverter is attached to the interchangeable lens; calculating the zoom position of the zoom ring; determining whether the zoom position is within a limited range in which optical performance deteriorates if the teleconverter is attached to the interchangeable lens; and changing information displayed on the display panel if the zoom position is within the limited range.

20 Claims, 15 Drawing Sheets

(56) References Cited

U.S. PATENT DOCUMENTS

| | | | | |
|---|---|---|---|---|
| 2018/0343380 | A1* | 11/2018 | Watanabe ............ | H04N 23/635 |
| 2023/0384555 | A1 | 11/2023 | Shinano | |

FOREIGN PATENT DOCUMENTS

| | | | |
|---|---|---|---|
| JP | 2005-210471 | A | 8/2005 |
| JP | 2005-258202 | A | 9/2005 |
| JP | 2006-184814 | A | 7/2006 |
| JP | 2007-322481 | A | 12/2007 |
| JP | 2023-176401 | A | 12/2023 |
| WO | 2008/065843 | A1 | 6/2008 |

* cited by examiner

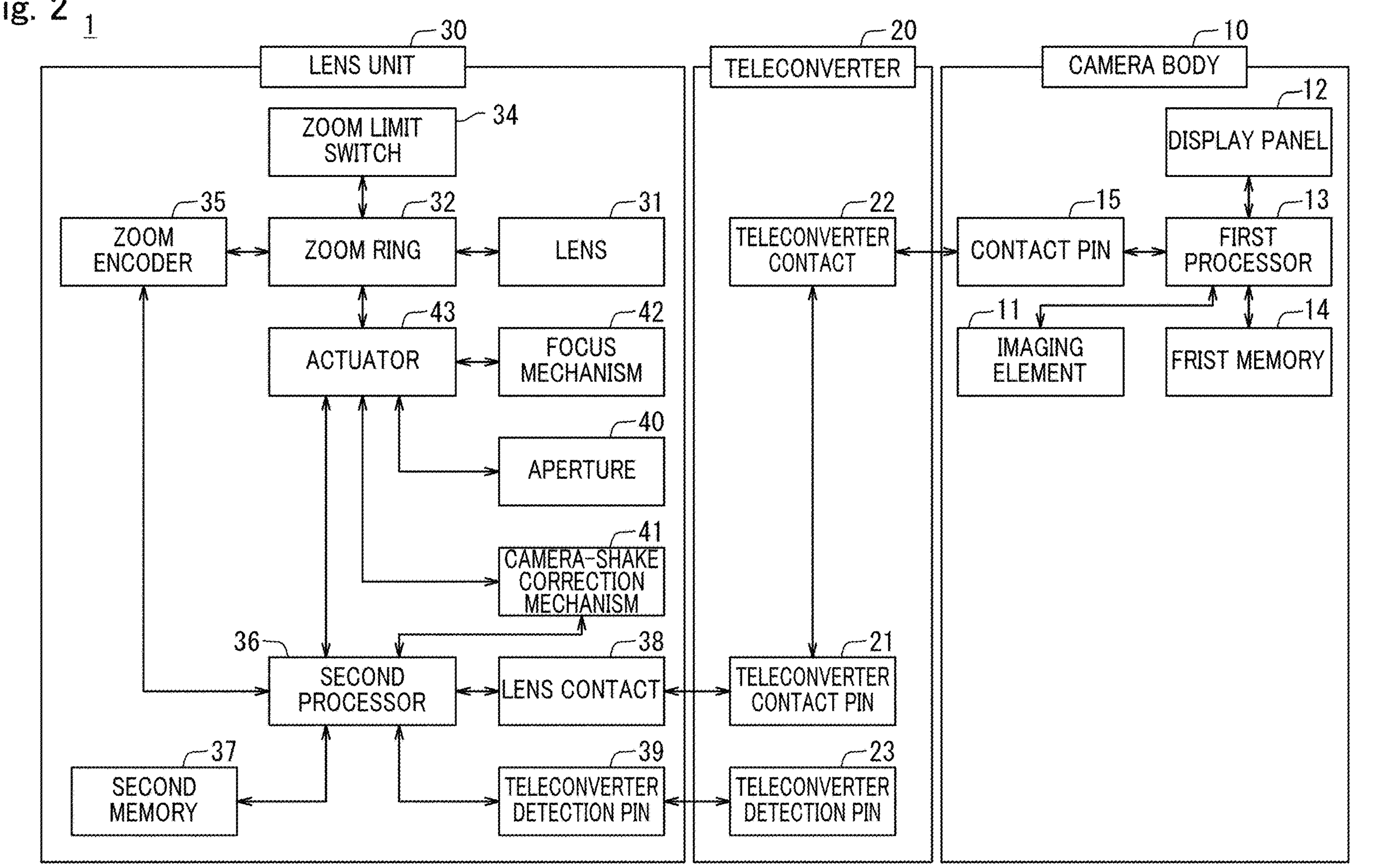
Fig. 2
1
LENS UNIT
30
TELECONVERTER
20
CAMERA BODY
10
ZOOM LIMIT SWITCH
34
DISPLAY PANEL
12
ZOOM ENCODER
35
ZOOM RING
32
LENS
31
TELECONVERTER CONTACT
22
CONTACT PIN
15
FIRST PROCESSOR
13
ACTUATOR
43
FOCUS MECHANISM
42
IMAGING ELEMENT
11
FRIST MEMORY
14
APERTURE
40
CAMERA-SHAKE CORRECTION MECHANISM
41
SECOND PROCESSOR
36
LENS CONTACT
38
TELECONVERTER CONTACT PIN
21
SECOND MEMORY
37
TELECONVERTER DETECTION PIN
39
TELECONVERTER DETECTION PIN
23

IMAGING APPARATUS AND METHOD FOR CONTROLLING IMAGING APPARATUS INCLUDING LIMITED RANGE DETERMINATION

CROSS REFERENCE TO RELATED APPLICATION

This application claims benefit of priority to Japanese Patent Application 2023-143983, filed Sep. 5, 2023, the entire content of which is incorporated herein by reference.

BACKGROUND

Technical Field

The present disclosure relates to an imaging apparatus and a method for controlling the imaging apparatus.

Background Art

For example, JP-A-2000-231149 discloses a camera that can change the focal length by attaching a teleconverter. The camera described in JP-A-2000-231149 includes a setting means that sets a teleconverter mode, and a warning means that issues a warning if the combined focal length due to the attachment of the teleconverter is less than a predetermined value when the teleconverter mode is set by the setting means. The camera described in JP-A-2000-231149 thereby prevents vignetting when a teleconverter is attached to the camera lens.

In an imaging apparatus to which an interchangeable lens can be attached via a teleconverter, optical performance may deteriorate when the teleconverter is attached to the interchangeable lens.

SUMMARY

Thus, an object of the present disclosure is to provide an imaging apparatus to which an interchangeable lens can be attached via a teleconverter, which changes display when optical performance deteriorates, and a method for controlling the imaging apparatus.

In order to achieve the above object, an imaging apparatus according to one aspect of the present disclosure is an imaging apparatus to which an interchangeable lens is attachable via a teleconverter, comprising:

a processor;

a memory storing instructions to be executed by the processor;

a camera body including an imaging element and a display panel; and an interchangeable lens including a lens, a zoom ring that varies position of the lens, and a zoom encoder that detects information on zoom position of the zoom ring;

the instructions including:

determining whether the teleconverter is attached to the interchangeable lens;

calculating the zoom position based on information detected by the zoom encoder;

determining whether the zoom position is within a limited range in which optical performance deteriorates if the teleconverter is attached to the interchangeable lens; and changing information displayed on the display panel if the zoom position is within the limited range.

A method for controlling an imaging apparatus according to one aspect of the present disclosure is a control method of an imaging apparatus executed by a processor, wherein the imaging apparatus is an imaging apparatus to which an interchangeable lens is attachable via a teleconverter, the imaging apparatus comprising:

a camera body including an imaging element and a display panel; and the interchangeable lens including a lens, a zoom ring that varies position of the lens, and a zoom encoder that detects information on zoom position of the zoom ring, the method comprising:

determining whether the teleconverter is attached to the interchangeable lens;

calculating the zoom position based on information detected by the zoom encoder;

determining whether the zoom position is within a limited range in which optical performance deteriorates if the teleconverter is attached to the interchangeable lens; and changing information displayed on the display panel if the zoom position is within the limited range.

According to the present disclosure, it is possible to provide an imaging apparatus to which an interchangeable lens can be attached via a teleconverter, which changes display when optical performance deteriorates, and a method for controlling the imaging apparatus.

BRIEF DESCRIPTION OF DRAWINGS

FIG. 2 is a block diagram showing a main configuration of the imaging apparatus according to the first embodiment of the present disclosure;

FIG. 6C is a diagrammatic view showing an example of information displayed on the display panel;

DETAILED DESCRIPTION

Background to this Disclosure

An imaging apparatus is known to which an interchangeable lens can be attached via a teleconverter. The interchangeable lens changes its focal length by attaching the teleconverter.

When a teleconverter is attached to an interchangeable lens, a lens on the side where the teleconverter is attached among a plurality of lenses of the interchangeable lens may interfere with the teleconverter at a given zoom position. To avoid interference between the lens of the interchangeable lens and the teleconverter, for example, a configuration has been considered where the lens is retracted in a direction away from the teleconverter.

However, when the lens is retracted, optical performance deteriorates because the lens position shifts from the ideal optical design value. The optical performance includes, for example, resolution and aberration. In addition, focal length adjustment may not be performed properly.

In this manner, when a teleconverter is attached to an interchangeable lens, optical performance may deteriorate. In this case, it is difficult for the user to know whether the deterioration in optical performance is caused by the teleconverter.

Thus, the inventor(s) have found a configuration in which the display is changed to notify the user when the optical performance is deteriorating in an imaging apparatus to which an interchangeable lens can be attached via a teleconverter, and have arrived at the present disclosure.

Embodiments will now be described in detail with reference to the drawings as appropriate. However, more detailed explanations than necessary may be omitted. For example, detailed explanations of already well-known matters and duplicate explanations for substantially the same configurations may be omitted. This is to avoid the following description becoming unnecessarily redundant and to facilitate understanding of those skilled in the art.

The inventor(s) provide the accompanying drawings and the following description to enable those skilled in the art to fully understand the present disclosure, but do not intend to thereby limit the subject matter defined in the appended claims.

Hereinafter, an imaging apparatus and a method for controlling the imaging apparatus according to a first embodiment of the present disclosure will be described with reference to the drawings.

First Embodiment

Overall Configuration

Figure 1:
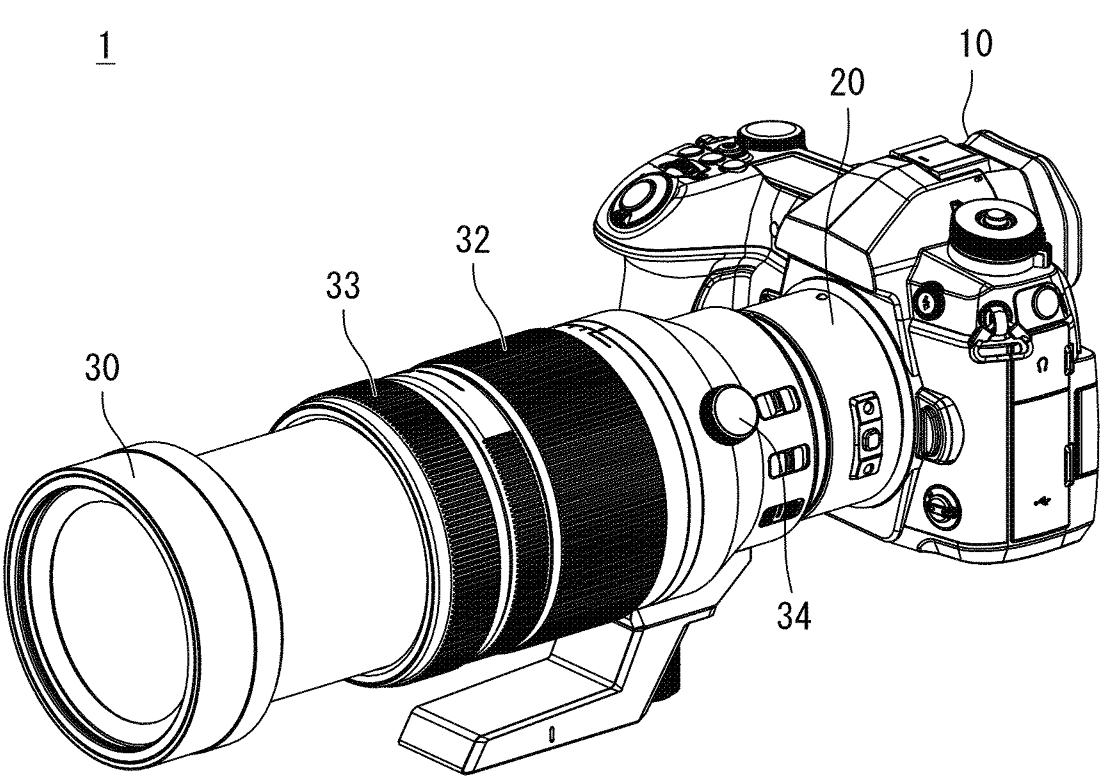
FIG. 1 is a schematic perspective view of an imaging apparatus according to a first embodiment of the present disclosure.
Figure 3A:
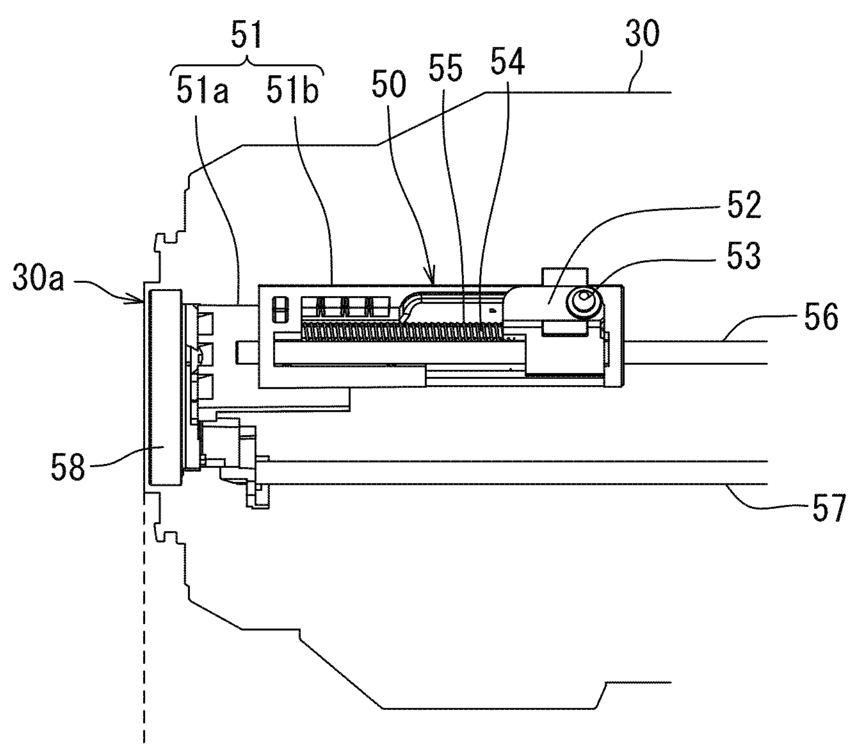
FIG. 3A is a schematic view showing an example of a retraction mechanism for an interchangeable lens.
Figure 3B:
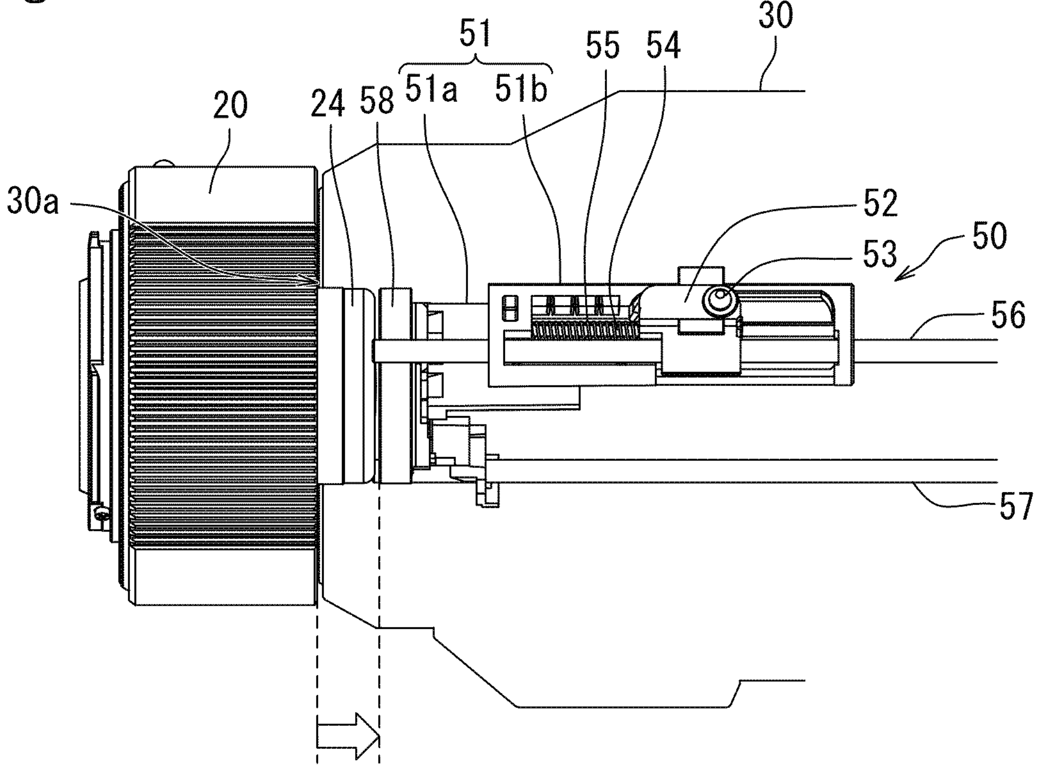
FIG. 3B is a schematic view showing the example of the retraction mechanism for the interchangeable lens.

FIG. 1 is a schematic perspective view of an imaging apparatus 1 according to the first embodiment of the present disclosure. FIG. 2 is a block diagram showing a main configuration of the imaging apparatus 1 according to the first embodiment of the present disclosure. FIGS. 3A and 3B are schematic views showing an example of a retraction mechanism 50 for an interchangeable lens 30.

As shown in FIGS. 1 and 2, the imaging apparatus 1 according to the first embodiment of the present disclosure is, for example, an interchangeable-lens camera. The imaging apparatus 1 includes a camera body 10, a teleconverter 20, and the interchangeable lens 30.

The camera body 10 is a body that controls the imaging apparatus 1. The camera body 10 has a body mount to which the teleconverter 20 or the interchangeable lens 30 is attachable.

The teleconverter 20 is a substantially cylindrical auxiliary member used to extend the focal length of the interchangeable lens 30. The teleconverter 20 includes a plurality of lenses. For example, the teleconverter 20 extends the lens focal length of the interchangeable lens 30 by 1.4 times or 2.0 times. The teleconverter 20 is detachably attached to the body mount of the camera body 10.

The interchangeable lens 30 has an optical system that guides a subject image to the camera body 10. The interchangeable lens 30 can perform variable magnification shooting by the built-in optical system moving between a wide-angle side (WIDE end) and a telephoto side (TELE end). The interchangeable lens 30 is attachable to the camera body 10 via the teleconverter 20. The interchangeable lens 30 is detachably attached to the teleconverter 20. The interchangeable lens 30 may be attached directly to the camera body 10 without using the teleconverter 20.

In the case of attaching the interchangeable lens 30 to the camera body 10 via the teleconverter 20, a lens toward the teleconverter 20 among a plurality of lenses 31 of the interchangeable lens 30 may interfere with the teleconverter 20. For this reason, as shown in FIGS. 3A and 3B, the interchangeable lens 30 has the retraction mechanism 50 for avoiding interference with the teleconverter 20.

The retraction mechanism 50 includes a body 51, a cam pin holder 52, a cam pin 53, a cam pin holder guide shaft 54, a biasing spring 55, a main shaft 56, a counter shaft 57, and a buffer member 58.

When the teleconverter 20 is attached to an end 30*a* (on image surface side) opposite to the subject side in the optical axis direction of the interchangeable lens 30 shown in FIG. 3A, the retraction mechanism 50 retracts in the direction of arrow in FIG. 3B to avoid interference with a protrusion 24 of the teleconverter 20. For example, the protrusion 24 is a holder that holds a lens of the teleconverter 20.

As shown in FIGS. 3A and 3B, in the case where the teleconverter 20 is attached to the interchangeable lens 30, the body 51 holding a lens 31 can be retracted while the cam pin holder 52 holding the cam pin 53 remains unchanged in position. For example, the cam pin 53 engages with a cam frame disposed on a member that holds another lens 31.

The body 51 has a substantially annular lens holding portion 51*a* that holds the lens 31, and an extended portion 51*b* that holds the main axis 56 and that is formed to extend from the substantially annular portion along the optical axis direction. The cam pin holder 52 is disposed in a groove formed in the extended portion 51*b* of the body 51. The cam pin holder 52 moves along the optical axis direction within the extended portion 51*b* to move relative to the lens holding portion 51*a* of the body 51.

The cam pin holder guide shaft 54 is disposed along the optical axis direction within the extended portion 51*b* of the body 51. The cam pin holder guide shaft 54 supports the cam pin holder 52 so as to be movable back and forth in the optical axis X direction. The cam pin holder guide shaft 54 has the biasing spring 55 disposed on its outer circumferential surface for biasing the cam pin holder 52 in the optical axis direction.

The cam pin holder 52 moving along the cam pin holder guide shaft 54 is held within the extended portion 51*b* of the body 51 while being urged in the optical axis direction by the biasing spring 55.

The biasing spring 55 is held wound around the outer circumference of the cam pin holder guide shaft 54 and urges in the optical axis direction the side surface of the cam pin holder 52 that moves in the optical axis direction along the cam pin holder guide shaft 54. When the teleconverter 20 is attached to the interchangeable lens 30, the biasing spring 55 contracts and moves the body 51 in the optical axis direction without changing the position of the cam pin holder 52, to retract it so as not to interfere with the protrusion 24 of the teleconverter 20.

The main shaft 56 is disposed along the optical axis direction and guides the body 51 in the optical axis direction. The main shaft 56 supports the cam pin holder 52 so as to be movable back and forth in the optical axis X direction.

The counter shaft 57 is disposed approximately parallel to the main shaft 56 and supports the outer circumferential portion of the lens holding portion 51*a* of the body 51. As a result, the retraction mechanism 50 moves back and forth in the optical axis direction while being supported by the main shaft 56 and the counter shaft 57.

The buffer member 58 is an elastic member attached to the end 30*a* of the interchangeable lens 30 opposite to the subject in the optical axis direction of the retraction mechanism 50. The buffer member 58 holds the lens 31 in such a manner as to sandwich the lens 31 between the buffer member 58 and the lens holding portion 51*a* of the body 51. In consequence, even if the protrusion 24 of the teleconverter 20 comes into contact with a member of the retraction mechanism 50 when the teleconverter 20 is attached to a mount of the interchangeable lens 30, the buffer effect of the buffer member 58 can reduce the impact at the time of contact.

As shown in FIG. 2, the camera body 10 includes an imaging element 11, a display panel 12, a first processor 13, a first memory 14, and a contact pin 15.

The imaging element 11 captures a subject image incident through the interchangeable lens 30 and the teleconverter 20 to generate image information. The imaging element 11 is, for example, a charge coupled device (CCD) sensor or a complementary metal oxide semiconductor (CMOS) sensor.

The display panel 12 displays information such as image information generated by the imaging element 11, setting information for image capture, and menu screens. For example, the display panel 12 displays a live view image captured by the imaging element 11. The live view image is image information that represents in real time the image information generated by the imaging element 11. The display panel 12 is, for example, a liquid crystal monitor.

The first processor 13 provides overall control for the camera body 10. The first processor 13 executes instructions stored in the first memory 14. For example, the first processor 13 may be implemented by various processors such as CPU, MPU, GPU, DSU, FPGA, ASIC, etc. The first processor 13 may be comprised of a dedicated electronic circuit designed to implement a predetermined function.

The first memory 14 stores instructions executed by the first processor 13. For example, the first memory 14 stores programs, parameters, or data used in controlling the first processor 13. The first memory 14 stores image information generated by the imaging element 11. The first memory 14 stores recorded video. For example, the first memory 14 can be implemented by RAM, DRAM, ferroelectric memory, flash memory, or a combination thereof.

The contact pin 15 is a pin for electrically connecting the camera body 10 to the teleconverter 20 or the interchangeable lens 30 and for transmitting and receiving various signals between the camera body 10 and the teleconverter 20 or the interchangeable lens 30. The contact pin 15 is in physical contact with a teleconverter contact 22 of the teleconverter 20 or a lens contact 38 of the interchangeable lens 30, which will be described later, to electrically connect to the teleconverter 20 or the interchangeable lens 30. For example, the contact pin 38 is disposed on the body mount of the camera body 10.

As shown in FIG. 2, the teleconverter 20 includes a teleconverter contact pin 21, the teleconverter contact 22, and a teleconverter detection pin 23. Although not shown, the teleconverter 20 includes a lens, a mount to which the interchangeable lens 30 is attached, and a mount to be attached to the camera body 10.

The teleconverter contact pin 21 is a pin for electrically connecting the teleconverter 20 to the interchangeable lens 30 and for transmitting and receiving various signals between the teleconverter 20 and the interchangeable lens 30. For example, the teleconverter contact pin 21 is disposed on the mount to which the interchangeable lens 30 is attached.

The teleconverter contact 22 is a contact for electrically connecting the teleconverter 20 to the camera body 10. For example, the teleconverter contact 22 is disposed on the mount to be attached to the camera body 10. When the teleconverter 20 is attached to the camera body 10, the teleconverter contact 22 comes into physical contact with the contact pin 15 of the camera body 10. This electrically connects the teleconverter contact 22 to the contact pin 15 of the camera body 10. The camera body 10 transmits and receives various signals to and from the teleconverter 20 via the contact pin 15 and the teleconverter contact 22.

The teleconverter contact 22 is electrically connected to the teleconverter contact pin 21. For example, the teleconverter contact 22 is connected via wiring to the teleconverter contact pin 21.

The teleconverter detection pin 23 is a pin for electrically connecting the teleconverter 20 to the interchangeable lens 30 and detecting whether the interchangeable lens 30 is attached to the teleconverter 20. For example, the teleconverter detection pin 23 is disposed on the mount to which the interchangeable lens 30 is attached. The teleconverter detection pin 23 comes into physical contact with a teleconverter detection contact 39 of the interchangeable lens 30, which will be described later, to electrically connect to the interchangeable lens 30.

As shown in FIGS. 1 and 2, the interchangeable lens 30 includes the plurality of lenses 31, a zoom ring 32, a focus ring 33, a zoom limit switch 34, a zoom encoder 35, a second processor 36, a second memory 37, the lens contact 38, the teleconverter detection contact 39, an aperture 40, a camera-shake correction mechanism 41, a focus mechanism 42, and an actuator 43. As shown in FIGS. 3A and 3B, the interchangeable lens 30 includes the retraction mechanism 50 for the lenses 31.

The lenses 31 are arranged along the optical axis direction. For example, the lenses 31 include a zoom lens and a focus lens. The zoom lens is a lens for changing the magnification of the subject image. The zoom lens is composed of one or more lenses. The zoom lens moves forward or backward along the optical axis direction. This changes the focal length of the interchangeable lens 30. The change in distance between the lenses 31 enables wide-angle and telephoto shooting. The focus lens is a lens for changing the focus state of the subject image. The focus lens is composed of one or more lenses. The focus lens moves forward or backward along the optical axis direction. The lenses 31 may include lenses other than the zoom lens and the focus lens. In this embodiment, the lenses 31 include a fixed lens on the side of the interchangeable lens 30 where the teleconverter 20 is attached.

The zoom ring 32 varies the focal length of the interchangeable lens 30. The zoom ring 32 is an annular member attached to the cylindrical exterior of the interchangeable lens 30 and is rotatable around the outer circumferential surface of the interchangeable lens 30. The zoom ring 32 varies the positions of the plurality of lenses 31. Specifically, the zoom ring 32 varies the position of the zoom lens among the plurality of lenses 31. For example, the zoom ring 32 interlocks with the plurality of lenses 31 and rotating the zoom ring 32 moves the plurality of lenses 31 in the optical axis. Hence, the zoom position adjusted with the zoom ring 32 corresponds to the focal length of the interchangeable lens 30.

The focus ring 33 adjusts focus. Similar to the zoom ring 32, the focus ring 33 is an annular member attached to the cylindrical exterior of the interchangeable lens 30 and is rotatable around the outer circumferential surface of the interchangeable lens 30. The focus ring 33 varies the positions of the plurality of lenses 31. Specifically, the focus ring 33 varies the position of the focus lens among the plurality of lenses 31.

The zoom limit switch 34 limits the adjustment range of the focal length of the interchangeable lens 30. For example, the zoom limit switch 34 is a mechanical switch that physically restricts the rotation of the zoom ring 32. The zoom limit switch 34 can limit the zoom position adjusted by the rotation of the zoom ring 32 to a range from the TELE end to a limit position. The zoom limit switch 34 is switched ON/OFF by a user's operation.

In the state where the interchangeable lens 30 is attached to the camera body 10 via the teleconverter 20, the lens toward the teleconverter 20 among the plurality of lenses 31 is retracted by the retraction mechanism 50. When the lens toward the teleconverter 20 is retracted, the zoom position adjusted by rotation of the zoom ring 32 does not correspond to the focal length implemented by the plurality of lenses 31. As a result, optical performance is not guaranteed.

When the zoom limit switch 34 is switched ON, the zoom position adjusted by rotation of the zoom ring 32 is limited to a focal length range that can guarantee optical performance. Specifically, when the zoom limit switch 34 is ON, the zoom position is limited to a range from the TELE end to the limit position. The zoom limit switch 34 physically restricts the rotation of the zoom ring 32, thereby restricting the zoom position from moving from the limit position to the WIDE end. For example, the limit position is a position closest to the WIDE end where optical performance can be guaranteed. In this embodiment, the limit position is the zoom position corresponding to the position where the lens 31 start to retract.

The zoom encoder 35 detects information on the zoom position of the zoom ring 32. The zoom encoder 35 is disposed on the inner circumferential side of the zoom ring 32 and detects the rotational position or the amount of rotation of the zoom ring 32.

The second processor 36 provides overall control for the interchangeable lens 30. The second processor 36 executes instructions stored in the second memory 37. For example, the second processor 36 may be implemented by various processors such as CPU, MPU, GPU, DSU, FPGA, ASIC, etc. The second processor 36 may be comprised of a dedicated electronic circuit designed to implement a predetermined function.

The second memory 37 stores instructions executed by the second processor 36. For example, the second memory 37 stores programs, parameters, data, etc. used when controlling the second processor 36. For example, the second memory 37 can be implemented by RAM, DRAM, ferroelectric memory, flash memory, or a combination thereof.

The lens contact 38 is a contact for electrically connecting the interchangeable lens 30 to the teleconverter 20. For example, the lens contact 38 is disposed on the mount to be attached to the teleconverter 20. When the interchangeable lens 30 is attached to the teleconverter 20, the lens contact 38 comes into physical contact with the teleconverter contact pin 21 of the teleconverter 20. This electrically connects the lens contact 38 to the teleconverter contact pin 21 of the teleconverter 20. The interchangeable lens 30 transmits and receives various signals to and from the teleconverter 20 via the teleconverter contact pin 21 and the lens contact 38.

The teleconverter detection contact 39 is a contact for electrically connecting the interchangeable lens 30 to the teleconverter 20 and detecting whether the interchangeable lens 30 is attached to the teleconverter 20. For example, the teleconverter detection contact 39 is disposed on the mount to be attached to the teleconverter 20. The teleconverter detection contact 39 is electrically connected to teleconverter 20 by coming into physical contact with the teleconverter detection pin 23 of the teleconverter 20.

The aperture 40 adjusts the amount of light that enters the imaging surface of the imaging element 11 from the subject. The aperture 40 adjusts the amount of light incident on the imaging surface by changing the size of the through-hole through which the light passes. The aperture 40 is driven by the actuator 43.

The camera-shake correction mechanism 41 corrects the shake of the interchangeable lens 30. For example, the camera-shake correction mechanism 41 includes an optical image stabilizer (OIS) lens, a gyro sensor, and a position sensor. The OIS lens is a lens for correcting the shake of a subject image. The OIS lens is composed of one or more lenses. The OIS lens moves in a direction that offsets the shake of the interchangeable lens 30, thereby reducing the shake of the subject image on the imaging element 11. The gyro sensor detects the shake of the interchangeable lens 30. The position sensor detects the position of the OIS lens in a plane perpendicular to the optical axis direction. Based on the detection results of the gyro sensor and the position sensor, the second processor 36 controls the actuator 43 to perform shake correction processing to move the OIS lens in the plane perpendicular to the optical axis direction so as to offset the shake of the interchangeable lens 30.

The focus mechanism 42 adjusts the focus. For example, the focus mechanism 42 has a mechanism for moving the focus lens in the optical axis direction and is driven by the actuator 43.

The actuator 43 includes one or more actuators that drive various components of the interchangeable lens 30. For example, the actuator 43 includes a plurality of actuators that drive the aperture 40, the camera-shake correction mechanism 41, and the focus mechanism 42. The actuator 43 is controlled by the second processor 36.

Imaging Apparatus Control Concept

Figure 4:
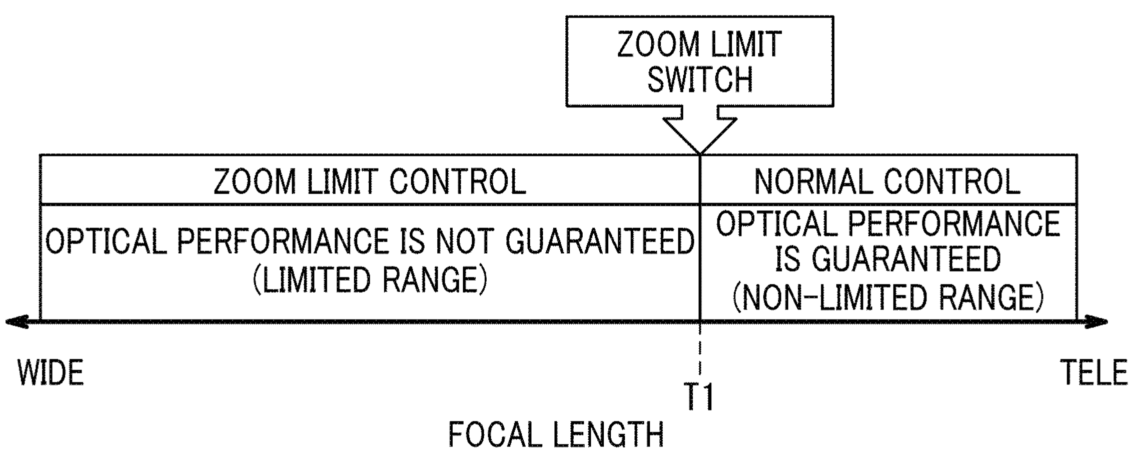
FIG. 4 is a diagrammatic view for explaining the concept of control of the imaging apparatus according to the first embodiment of the present disclosure.

FIG. 4 is a diagrammatic view for explaining the concept of control for the imaging apparatus 1 according to the first embodiment of the present disclosure. FIG. 4 shows a combined focal length including a guaranteed range and an out-of-guarantee range of optical performance in the imaging apparatus 1 to which the interchangeable lens 30 is attached via the teleconverter 20. The combined focal length is a focal length calculated based on the combination of the teleconverter 20 and the interchangeable lens 30. For example, the combined focal length is calculated based on the magnification of the teleconverter 20 and the focal length of the interchangeable lens 30.

As shown in FIG. 4, there are two ranges in the combined focal length of the imaging apparatus 1: a range in which optical performance is guaranteed; and a range in which optical performance is not guaranteed. The range guaranteeing optical performance and the range not guaranteeing optical performance are separated by a limit position T1. The range guaranteeing optical performance is the range from the TELE end to the limit position T1, while the range not guaranteeing optical performance is the range from the WIDE end to the limit position T1. For example, the limit position T1 is the position at which the retraction mechanism 50 starts retracting the lens 31.

The interchangeable lens 30 includes the zoom limit switch 34 to prevent the user from capturing an image within the range that does not guarantee optical performance. When the zoom limit switch 34 is ON, the rotation of the zoom ring 32 is restricted so that the zoom position is limited between the TELE end and the limit position T1, preventing movement into a range where optical performance is not guaranteed.

However, since the zoom limit switch 34 is a mechanical switch, it will not operate unless it is turned ON by the user's operation. For example, if the user forgets to turn ON the zoom limit switch 34 while capturing an image, the zoom limit switch 34 will not operate, allowing the zoom ring 32 to move beyond the limit position T1 to the WIDE end side.

In this manner, when the zoom limit switch 34 is OFF, the zoom position is allowed to move to the range where optical performance is not guaranteed. Hence, the imaging apparatus 1 performs normal control when the zoom position is within the range that guarantees optical performance, and performs zoom limit control when the zoom position is within the range that does not guarantee optical performance. The zoom limit control is a control that notifies the user that the zoom position is within the range where optical performance is not guaranteed.

Imaging Apparatus Control Method

Figure 5A:
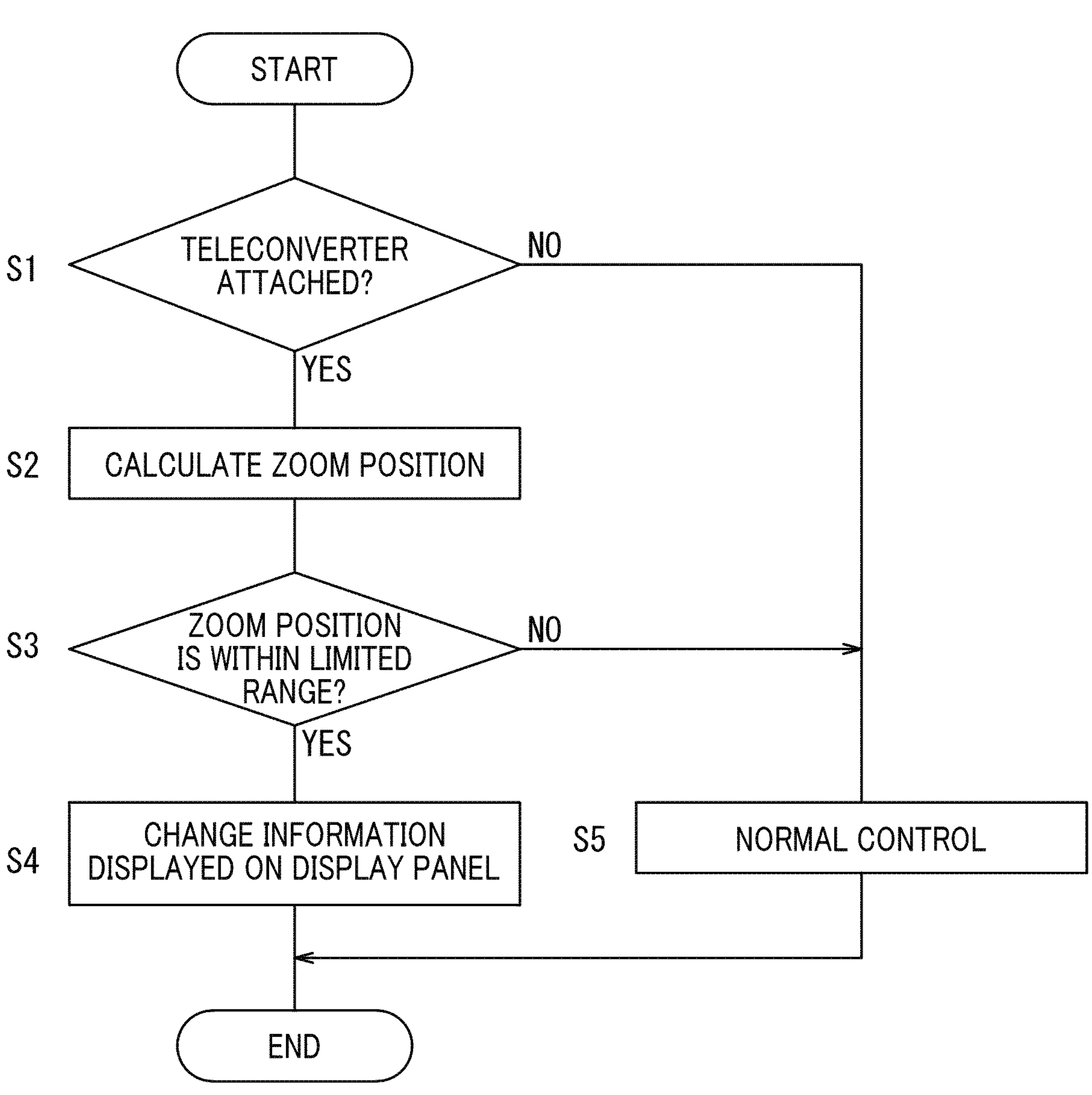
FIG. 5A is a flowchart showing an example of the action of the imaging apparatus according to the first embodiment of the present disclosure.
Figure 5B:
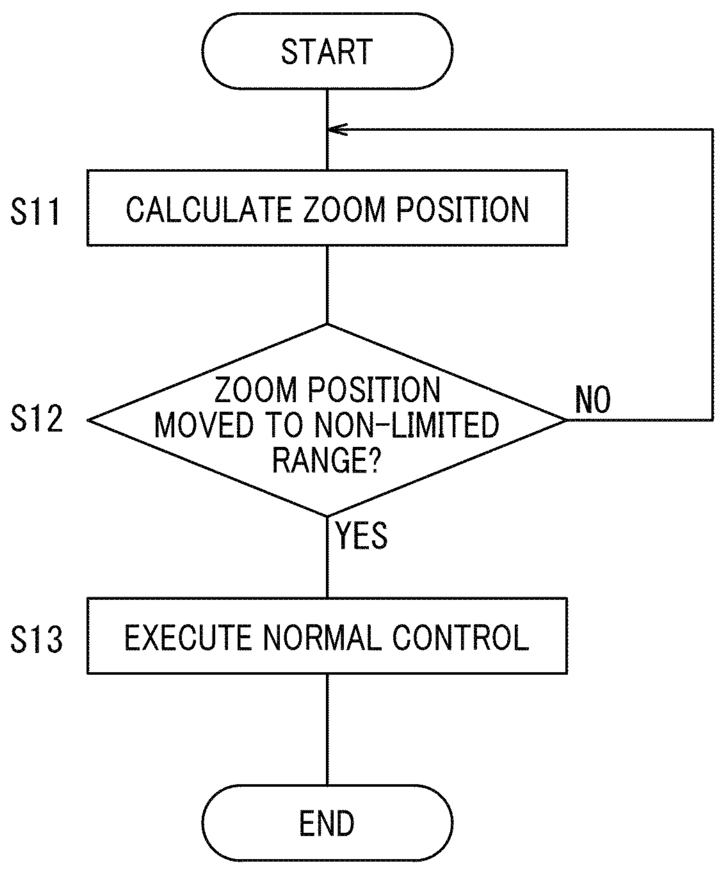
FIG. 5B is a flowchart showing an example of the action of the imaging apparatus according to the first embodiment of the present disclosure.

FIGS. 5A and 5B are flowcharts showing an example of the action of the imaging apparatus 1 according to the first embodiment of the present disclosure.

As shown in FIG. 5, Step S1 determines whether the teleconverter 20 is attached to the interchangeable lens 30.

For example, the second processor 36 of the interchangeable lens 30 determines whether the teleconverter detection contact 39 of the interchangeable lens 30 is electrically connected to the teleconverter detection pin 23 of the teleconverter 20. If the teleconverter detection contact 39 and the teleconverter detection pin 23 are electrically connected, the second processor 36 determines that the teleconverter 20 is attached to the interchangeable lens 30. If the teleconverter detection contact 39 and the teleconverter detection pin 23 are not electrically connected, the second processor 36 determines that the teleconverter 20 is not attached to the interchangeable lens 30.

If the teleconverter 20 is attached to the interchangeable lens 30, the process proceeds to step S2. If the teleconverter 20 is not attached to the interchangeable lens 30, the process proceeds to step S5.

Step S2 calculates the zoom position of the zoom ring 32. For example, step S2 includes detecting information on the zoom position of the zoom ring 32 by the zoom encoder 35 and calculating the zoom position based on the information detected by the zoom encoder 35.

For example, the zoom encoder 35 detects the rotational position of the zoom ring 32. The second processor 36 calculates the zoom position based on the rotational position of the zoom ring 32.

Step S3 determines whether the zoom position is within a limited range where the focal length adjustment is inhibited by the teleconverter 20.

The limited range is a range shown in FIG. 4 where optical performance is not guaranteed and where optical performance deteriorates. For example, the limited range is a range where the focal length of the interchangeable lens 30 cannot be adjusted properly even if the zoom ring 32 is turned by the teleconverter 20. In other words, the limited range is a range where the adjustment of the focal length with the zoom ring 32 is hindered by the teleconverter 20.

For example, the second processor 36 determines whether the zoom position calculated at step S2 is closer to the WIDE end than the limit position T1 shown in FIG. 4. If the zoom position is closer to the WIDE end than the limit position T1, the second processor 36 determines that the zoom position is within the limited range. If the zoom position is closer to the TELE end than the limit position T1, the second processor 36 determines that the zoom position is not within the limited range.

If the zoom position is within the limited range, the process advances to step S4. If the zoom position is not within the limited range, the process goes to step S5.

Step S4 executes zoom limit control to change information displayed on the display panel 12.

For example, the second processor 36 transmits a signal to change display information to the camera body 10. Upon receiving the signal, the first processor 13 of the camera body 10 changes the information displayed on the display panel 12.

Figure 6A:
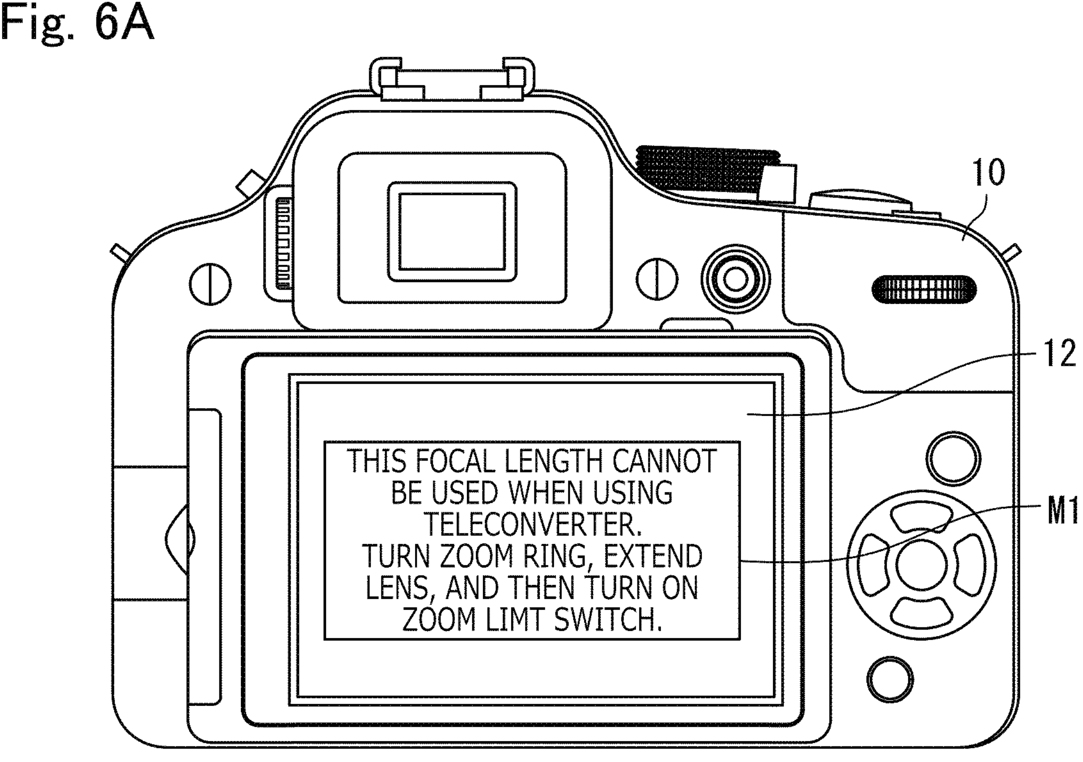
FIG. 6A is a diagrammatic view showing an example of information displayed on a display panel.
Figure 6B:
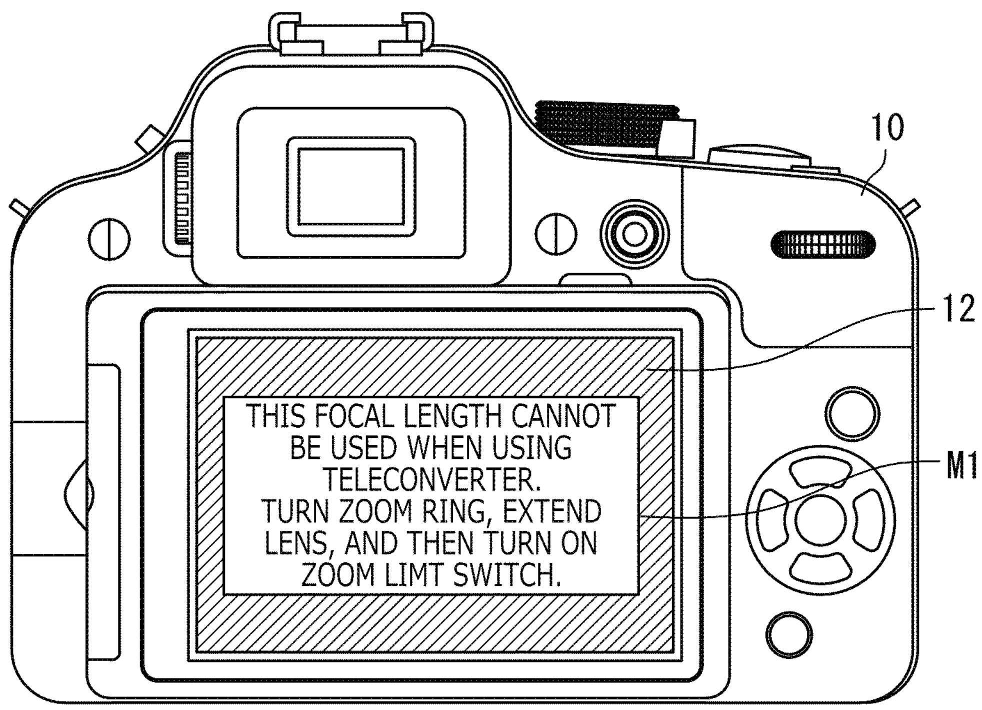
FIG. 6B is a diagrammatic view showing an example of information displayed on the display panel.
Figure 6C:
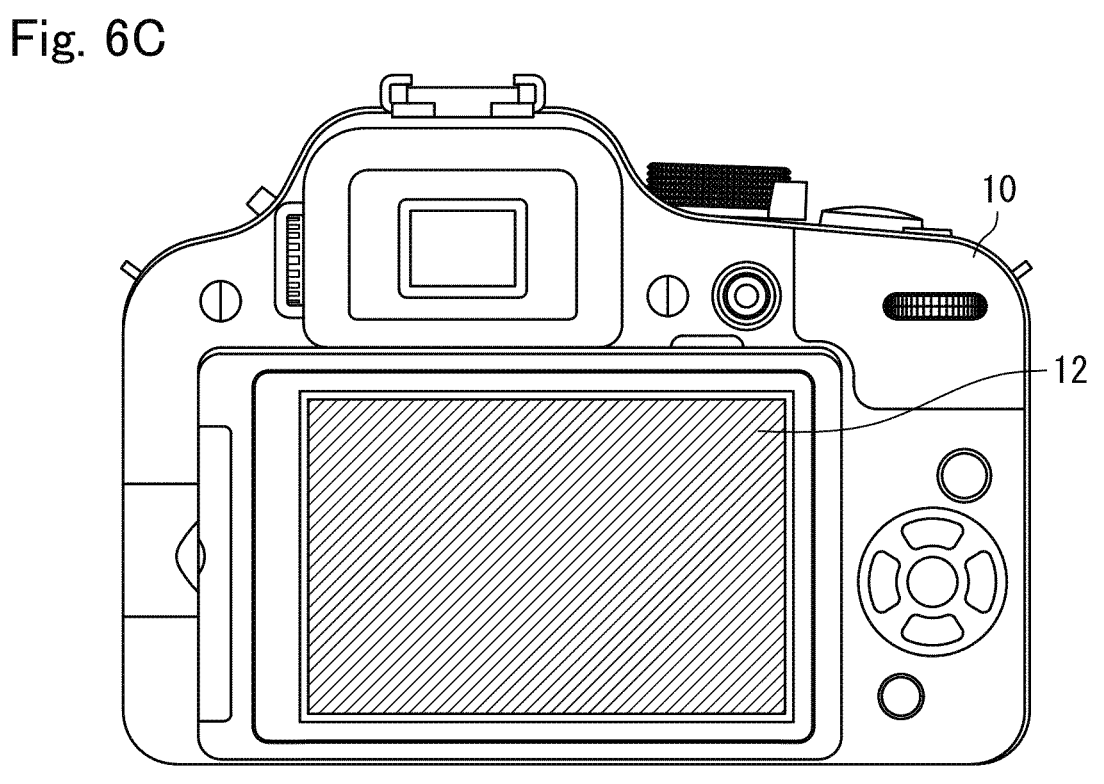

FIGS. 6A to 6C are diagrammatic view showing examples of information displayed on the display panel 12.

As shown in FIG. 6A, a message M1 may be displayed on the display panel 12. The message M1 may notify the user that the focal length is unavailable and urge the user to turn on the zoom limit switch 34. Note that the content of the message M1 is not limited thereto.

Alternatively, the display panel 12 may change image information being captured by the imaging element 11 to other display information and display it. The image information being captured by the imaging element 11 is a live view image. The other display information includes, for example, still image information. The still image information is an image that does not change over time, and includes, for example, illustrations, photographs, or text. For example, the illustration may include an icon. For example, the other display information may include information indicating that zoom limit control is in progress. Changing to other display information may mean changing at least a part of the live view image to the other display information.

As shown in FIG. 6B, the image displayed on the display panel 12 may be blacked out to display the message M1. For example, the entire area displayed on the display panel 12 may be blackened.

As shown in FIG. 6C, the image displayed on the display panel 12 may be blackened without displaying the message M1.

The display panel 12 is not limited to displaying the image displayed on the display panel 12 in black as shown in FIGS. 6B and 6C. For example, the display panel 12 may display the image displayed on the display panel 12 in white or in another color. Alternatively, the display panel 12 may display an illustration, photograph, text, or the like indicating a warning.

Referring back to FIG. 5, step S5 executes normal control to display a through image on the display panel 12.

The through image is an image captured by the imaging element 11.

In this manner, when the zoom position is within the limit range, the zoom limit control can notify the user thereof.

Control when returning from zoom limit control to normal control will then be described using FIG. 5B.

As shown in FIG. 5B, step S11 calculates the zoom position. Calculation of the zoom position is similar to step S2.

Step S12 determines whether the zoom position has moved from the limited range to a non-limited range where adjustment of the focal length is not inhibited by the teleconverter 20.

For example, the second processor 36 determines whether the zoom position calculated at step S11 is closer to the TELE end than the limit position T1 shown in FIG. 4. If the zoom position is closer to the TELE end than the limit position T1, the second processor 36 determines that the zoom position is within the non-limited range. If the zoom position is closer to the WIDE end than the limit position T1, the second processor 36 determines that the zoom position is not within the non-limited range.

If the zoom position is within the non-limited range, the process proceeds to step S13. If the zoom position is not within the non-limited range, the process goes back to step S11.

Step S13 executes normal control.

In this manner, the camera can return from the zoom limit control to the normal control.

Figure 7:
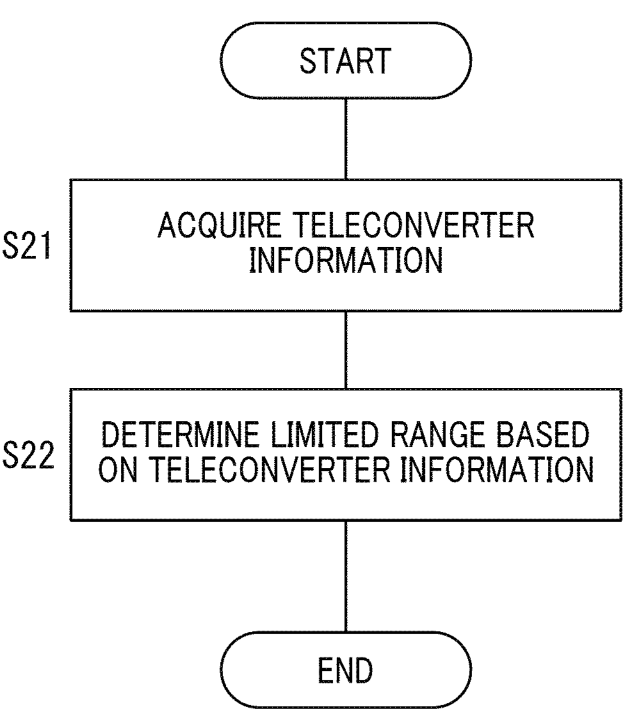
FIG. 7 is a flowchart showing an example of a process for determining a limited range of a zoom position.

FIG. 7 is a flowchart showing an example of a process for determining the limited range of the zoom position.

As shown in FIG. 7, step S21 acquires information of the teleconverter 20.

The second processor 36 acquires information on the magnification of the teleconverter 20. For example, the second processor 36 acquires information on the magnification or the identification number of the teleconverter 20.

Step S22 determines a limited range based on the information of the teleconverter 20.

For example, the second processor 36 determines the limited range based on the magnification of the teleconverter 20 and the lens focal length of the interchangeable lens 30. The lens focal length is stored in the second memory 37, for example.

In this manner, the limited range can be changed depending on the type of teleconverter 20.

Effects

The imaging apparatus 1 according to the first embodiment of the present disclosure can achieve the following effects.

The imaging apparatus 1 of the present disclosure is an imaging apparatus to which the interchangeable lens 30 can be attached via the teleconverter 20, and includes the processors 13 and 36, the memories 14 and 37, the camera body 10, and the interchangeable lens 30. The memories 14 and 37 store instructions executed by the processors 13 and 36. The camera body 10 includes the imaging element 11 and the display panel 12. The interchangeable lens 30 includes the lens 31, the zoom ring 32 that varies the position of the lens 31, and the zoom encoder 35 that detects information on the zoom position of the zoom ring 32. The instructions stored in the memories 14 and 37 include determining whether the teleconverter 20 is attached to the interchangeable lens 30 (S1) and calculating the zoom position of the interchangeable lens 30 (S2). The instructions include determining whether the zoom position is within the limited range where optical performance deteriorates when the teleconverter 20 is attached to the interchangeable lens 30 (S3). The instructions include changing information displayed on the display panel 12 when the zoom position is within the limited range (S4).

With such a configuration, when the teleconverter 20 is attached to the interchangeable lens 30, the information displayed on the display panel 12 can be changed if optical performance has deteriorated. This allows the user to be notified that the zoom position adjusted by the zoom ring 32 is within the range that does not guarantee optical performance.

Changing the information displayed on the display panel 12 (S4) includes displaying a message M1 on the display panel 12. With this configuration, the user can be notified by the message M1 that the zoom position of the interchangeable lens 30 is within the range that does not guarantee optical performance. For example, when the zoom position is within the range that does not guarantee optical performance, the imaging apparatus 1 can prompt the user by the message M1 to turn on the zoom limit switch 34.

Changing information displayed on the display panel 12 (S4) includes changing image information being captured by the imaging element 11 displayed on the display panel 12 to other display information. With this configuration, it is possible to notify the user and also inform the user of the range where optical performance is not guaranteed. For example, in the case of changing the entire display panel 12 to a black screen, the image information being captured can be hidden.

The instructions include detecting that the zoom position has moved from the limited range to the non-limited range where adjustment of the focal length is not inhibited by the teleconverter 20 (S12). The instructions include displaying information captured by the imaging element 11 on the display panel 12 when the zoom position has moved to the non-limited range (S13). Such a configuration allows return to normal control to display information captured by the imaging element 11 on the display panel 12.

The instructions include acquiring information of the teleconverter 20 (S21) and determining the limited range based on the information of the teleconverter 20 (S22). With this configuration, the limited range can be determined depending on the type of the teleconverter 20.

The limited range is from the WIDE end to the limit position T1, and the limit position T1 is determined based on the lens focal length of the interchangeable lens 30 and the magnification of the teleconverter 20. Such a configuration allows, for example, use of different types of teleconverters 20 with different magnifications or use of different interchangeable lenses 30 with different lens focal lengths.

In this embodiment, the example has been described in which the processing of the steps shown in FIGS. 5A and 5B and FIG. 7 is executed by the first processor 13 or the second processor 36, but the present disclosure is not limited thereto. For example, steps S1 to S3, S11 and S12, or S21 and S22 may be executed by the first processor 13.

In this embodiment, the example has been described in which the interchangeable lens 30 includes the zoom limit switch 34, but the present disclosure is not limited thereto. For example, the interchangeable lens 30 may not include the zoom limit switch 34.

In this embodiment, the example has been described in which the interchangeable lens 30 includes the aperture 40, the camera-shake correction mechanism 41, and the focus mechanism 42, but the present disclosure is not limited thereto. For example, the interchangeable lens 30 may not include the aperture 40, the camera-shake correction mechanism 41, and the focus mechanism 42.

In this embodiment, the example has been described in which the interchangeable lens 30 includes the retraction mechanism 50, but the interchangeable lens 30 may not include the retraction mechanism 50.

In this embodiment, a cause of deterioration in optical performance has been described as lying in retracting the lens 31 of the interchangeable lens 30 by the retraction mechanism 50 in order to prevent the lens 31 from coming into contact with the teleconverter 20. However, the cause of deterioration in optical performance is not limited to retraction of the lens 31 by the retraction mechanism 50.

The control method, program, and computer-readable storage medium for the imaging apparatus 1 according to the first embodiment of the present disclosure provide the same effects as those of the imaging apparatus 1 described above.

Second Embodiment

An imaging apparatus according to a second embodiment of the present disclosure will be described.

In the second embodiment, differences from the first embodiment will mainly be described. In the second embodiment, the same or equivalent configurations as in the first embodiment will be described with the same reference numerals. In the second embodiment, descriptions overlapping with those in the first embodiment will be omitted.

Figure 8A:
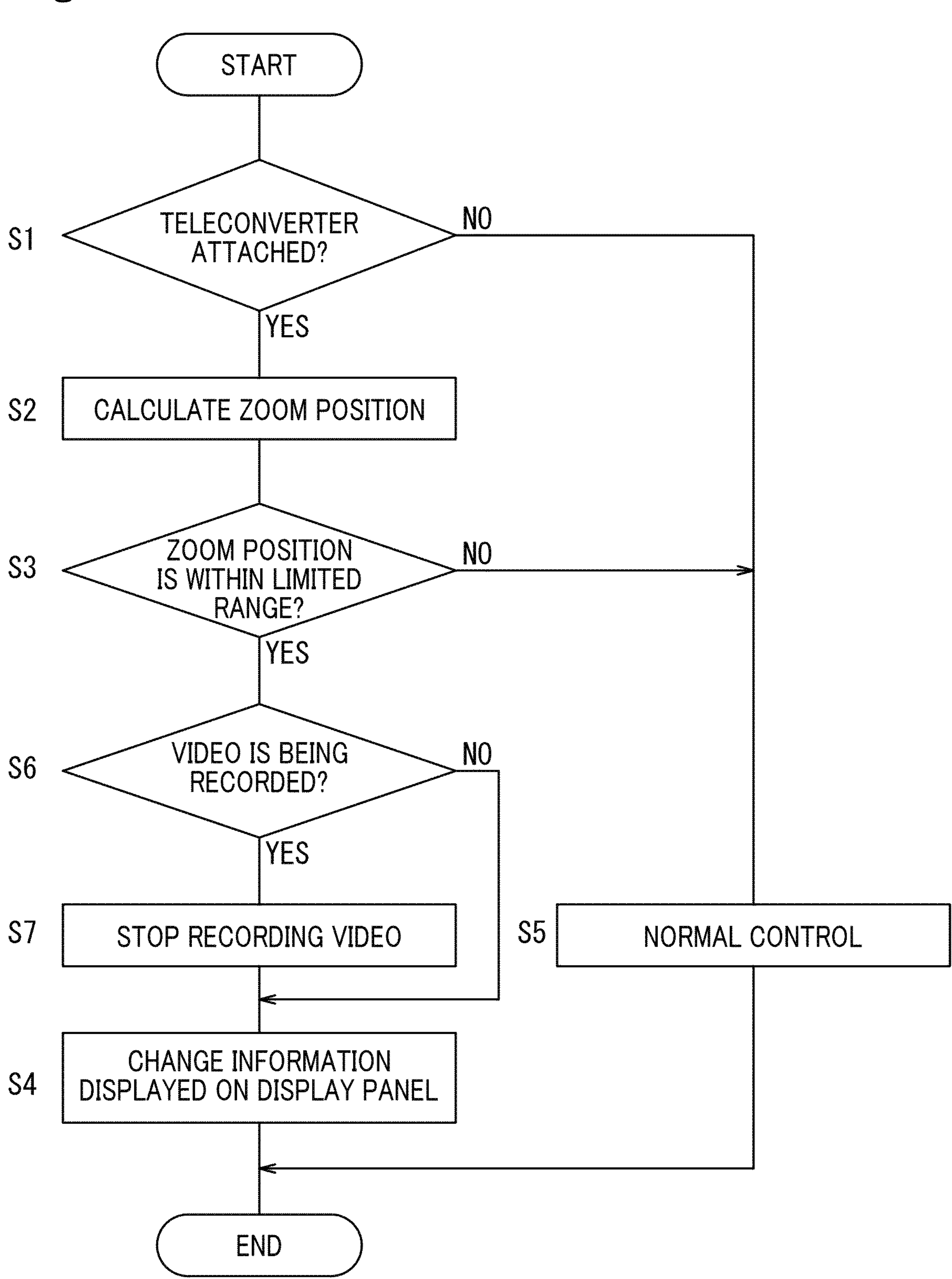
FIG. 8A is a schematic flowchart of a control method of an imaging apparatus according to a second embodiment of the present disclosure.

FIG. 8A is a schematic flowchart of a method for controlling the imaging apparatus 1 according to the second embodiment of the present disclosure.

The second embodiment differs from the first embodiment in that it is detected whether a video is being recorded and that if affirmative, the recording of the video is stopped.

Since in FIG. 8A, steps S1 to S5 are the same as those in the first embodiment, detailed description thereof will be omitted.

As shown in FIG. 8A, if the zoom position is within the limited range at step S3, the process proceeds to step S6.

Step S6 detects whether a video is being recorded by the imaging element 11.

For example, the first processor 13 of the camera body 10 detects whether the shooting mode is set to video recording.

If a video is being recorded, the process advances to step S7. If no video is being recorded, the process advances to step S4.

Step S7 stops recording the video.

For example, the first processor 13 stops recording the video by the imaging element 11.

In this manner, video recording is stopped when the zoom position is within the limited range where optical performance is not guaranteed, that is, during zoom limit control.

Control when returning from the zoom limit control to the normal control will then be described with reference to FIG. 8B.

Figure 8B:
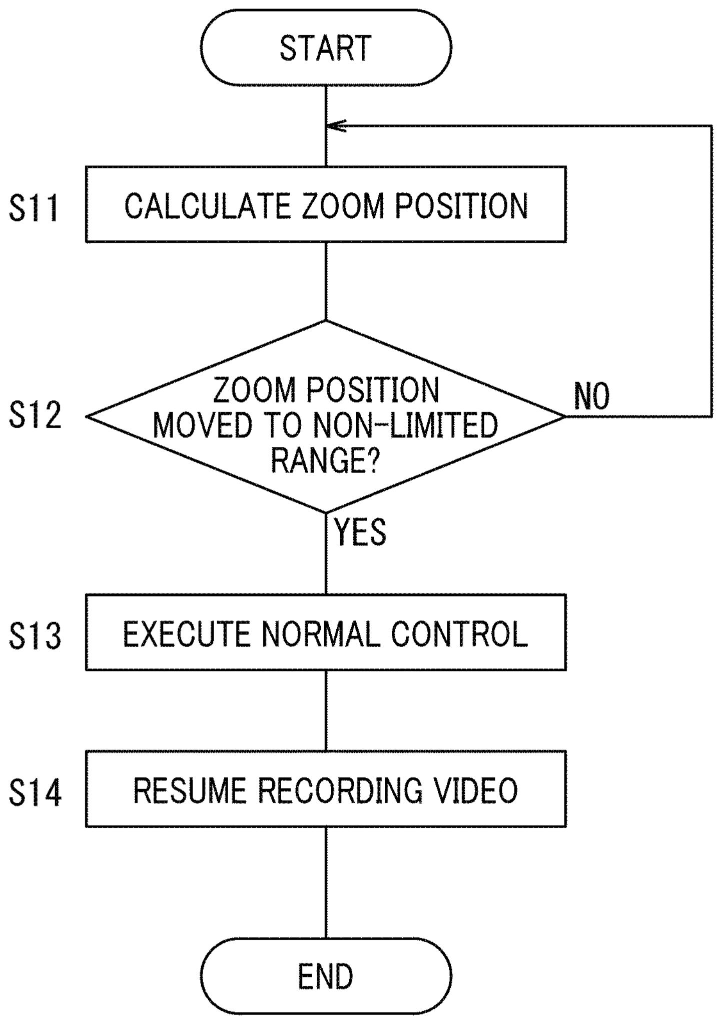
FIG. 8B is a schematic flowchart of the control method of the imaging apparatus according to the second embodiment of the present disclosure.

In FIG. 8B, steps S11 to S13 are the same as those in the first embodiment, and therefore detailed description thereof will be omitted.

As shown in FIG. 8B, when normal control is restored at step S13, video recording is resumed at step S14.

For example, the first processor 13 restarts video recording by the imaging element 11.

In this manner, when the camera returns to normal control from zoom limit control, video recording is resumed.

Effects

The imaging apparatus 1 according to the second embodiment of the present disclosure can achieve the following effects.

The instructions stored in the memories 14 and 37 of the imaging apparatus 1 of the present disclosure include detecting whether a video is being recorded by the imaging element 11 (S6), and if affirmative, stopping the video recording (S7). With this configuration, video recording is stopped when the zoom position is within the limited range that does not guarantee optical performance, and videos with image quality not guaranteeing optical performance are not saved. This can suppress the increase in the video capacity.

The instructions include detecting that the zoom position has moved from the limited range to the non-limited range where the adjustment of the focal length is not hindered by the teleconverter 20 (S12), and resuming video recording when the zoom position has moved to the non-limited range (S14). With this configuration, video recording can be resumed when the zoom position has moved from the limited range to the non-limited range. This allows video recording to start automatically, improving usability.

In this embodiment, the example has been described in which video recording is restarted at step S14, but the present disclosure is not limited thereto. For example, step S14 posterior to step S13 need not necessarily be performed. That is, video recording need not necessarily be resumed.

Third Embodiment

An imaging apparatus according to a third embodiment of the present disclosure will be described.

In the third embodiment, differences from the second embodiment will mainly be described. In the third embodiment, the same or equivalent configurations as in the second embodiment will be described with the same reference numerals. In the third embodiment, descriptions overlapping with those in the second embodiment will be omitted.

Figure 9:
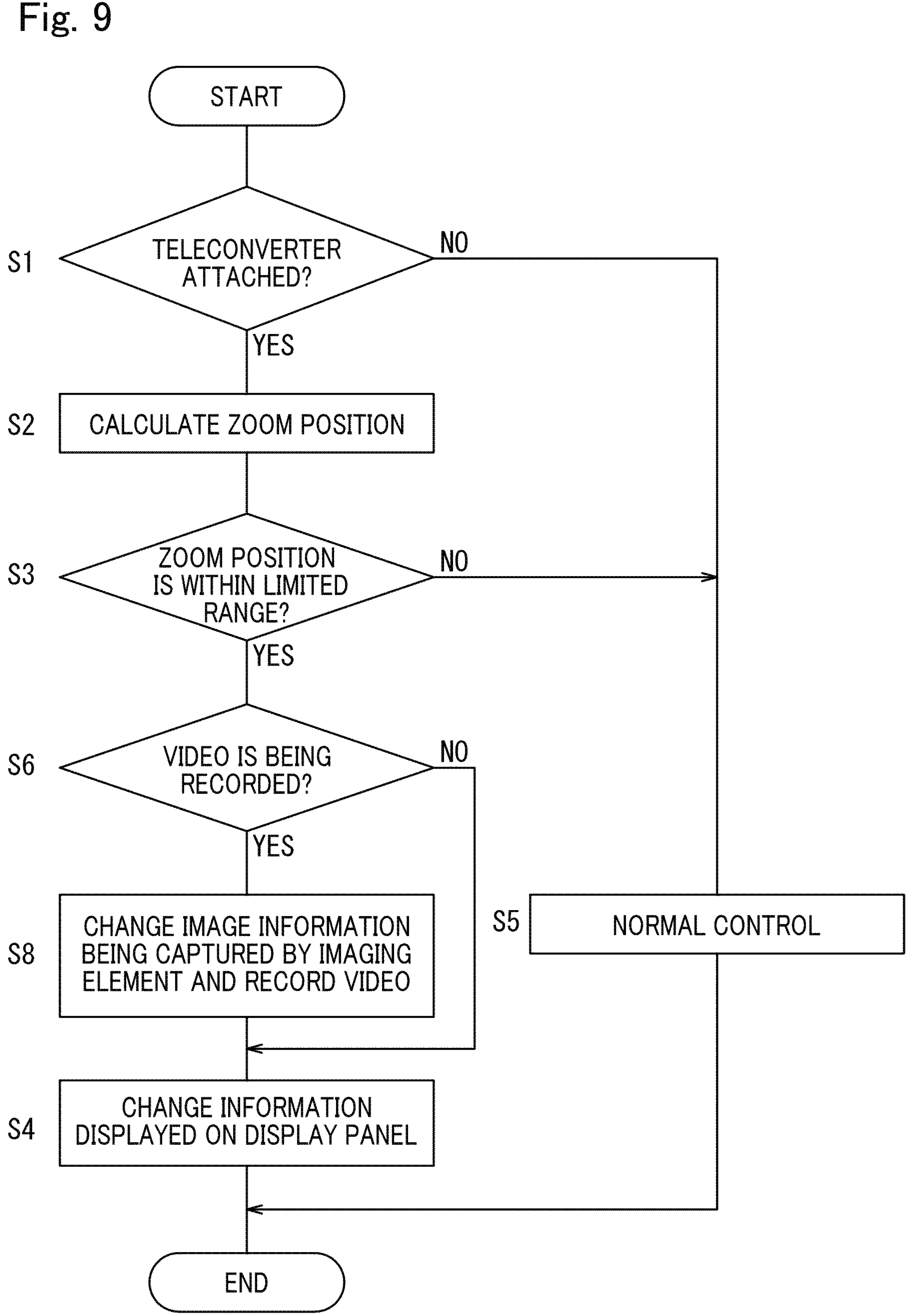
FIG. 9 is a schematic flowchart of a control method of an imaging apparatus according to a third embodiment of the present disclosure.

FIG. 9 is a schematic flowchart of a method for controlling the imaging apparatus 1 according to the third embodiment of the present disclosure.

The third embodiment differs from the second embodiment in that it is detected whether a video is being recorded and that if affirmative, image information captured by the imaging element 11 is changed to record the video.

Since in FIG. 9, steps S1 to S6 are the same as those in the first embodiment, detailed description thereof will be omitted.

As shown in FIG. 9, if it is determined at step S6 that a video is being recorded, the process advances to step S8.

Step S8 changes image information being captured by the imaging element 11 and records a video.

For example, the first processor 13 changes image information being captured by the imaging element 11 and records a video. For example, the first processor 13 may change image information being captured by the imaging element 11 to other image information and record a video. For example, the other image information includes still image information. The still image information includes, for example, illustrations, photographs, or text. For example, the other image information may include information indicating that zoom limit control is in progress. Changing to other image information may include changing at least a part of the image information being captured to other image information.

For example, the first processor 13 may record a video by changing image information being captured by the imaging element 11 to black image information. The first processor 13 may record a video by changing image information being captured by the imaging element 11 to white image information or image information of another color. The first processor 13 may record a video by changing the image information being captured by the imaging element 11 to image information such as illustrations, photographs, or text that warns that the image information is within the limited range.

Alternatively, the first processor 13 may record a video by inserting the message M1 into image information being captured by the imaging element 11. The first processor 13 may change image information being captured by the imaging element 11 to other image information, insert the message M1 into the image information, and record a video.

In this manner, video recording is continued when the zoom position is within the limited range where optical performance is not guaranteed, that is, even during zoom limit control. Image information being captured by the imaging element 11 is changed to record a video.

Effects

The imaging apparatus 1 according to the third embodiment of the present disclosure can achieve the following effects.

The instructions stored in the memories 14 and 37 of the imaging apparatus 1 of the present disclosure include detecting whether a video is being recorded by the imaging element 11 (S6), and if affirmative, changing image information being captured by the imaging element 11 to record a video (S8). With this configuration, video recording can be continued when the zoom position is in the limited range that does not guarantee optical performance. This makes it possible to prevent the user from forgetting to record a video. When a video is being recorded at the zoom position in the limited range that does not guarantee optical performance, the user can easily be informed that the zoom position does not guarantee optical performance in the recorded video.

Fourth Embodiment

An imaging apparatus according to a fourth embodiment of the present disclosure will be described.

In the fourth embodiment, differences from the first embodiment will mainly be described. In the fourth embodiment, the same or equivalent configurations as in the first embodiment will be described with the same reference numerals. In the fourth embodiment, descriptions overlapping with those in the first embodiment will be omitted.

Figure 10:
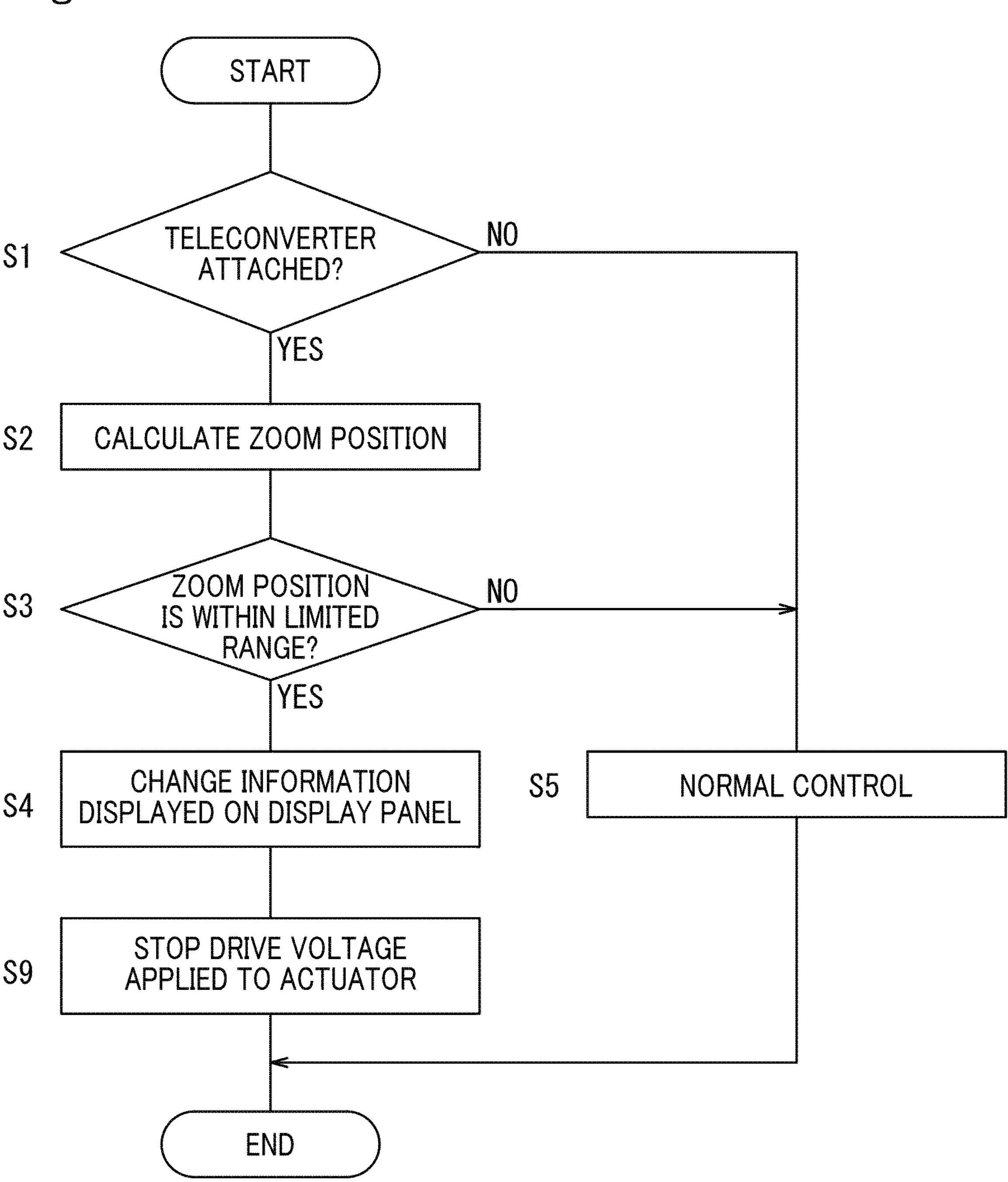
FIG. 10 is a schematic flowchart of a control method of an imaging apparatus according to a fourth embodiment of the present disclosure.

FIG. 10 is a schematic flowchart of a method for controlling the imaging apparatus 1 according to the fourth embodiment of the present disclosure.

The fourth embodiment differs from the first embodiment in that the drive voltage applied to the actuator 43 is stopped when the zoom position is within the limited range.

In FIG. 10, steps S1 to S5 are the same as those in the first embodiment, and therefore detailed description thereof will be omitted.

As shown in FIG. 10, if it is determined at step S3 that the zoom position is within the limited range, step S9 stops the drive voltage applied to the actuator 43.

For example, the second processor 36 stops the drive voltage applied to the actuator 43.

In this manner, when the zoom position is within the limited range, the drive voltage applied to the actuator 43, which drives the aperture 40, the camera-shake correction mechanism 41, and the focus mechanism 42, is stopped.

Effects

The imaging apparatus 1 according to the fourth embodiment of the present disclosure can achieve the following effects.

The instructions stored in the memories 14 and 37 of the imaging apparatus 1 of the present disclosure include stopping the drive voltage applied to the actuator 43 when the zoom position is within the limited range (S9). With this configuration, when the zoom position is within the limited range where optical performance is not guaranteed, application of the drive voltage to the actuator 43 is stopped so that the power consumed by the actuator 43 can be suppressed.

Fifth Embodiment

An imaging apparatus according to a fifth embodiment of the present disclosure will be described.

In the fifth embodiment, differences from the first embodiment will mainly be described. In the fifth embodiment, the same or equivalent configurations as in the first embodiment will be described with the same reference numerals. In the fifth embodiment, descriptions overlapping with those in the first embodiment will be omitted.

Figure 11:
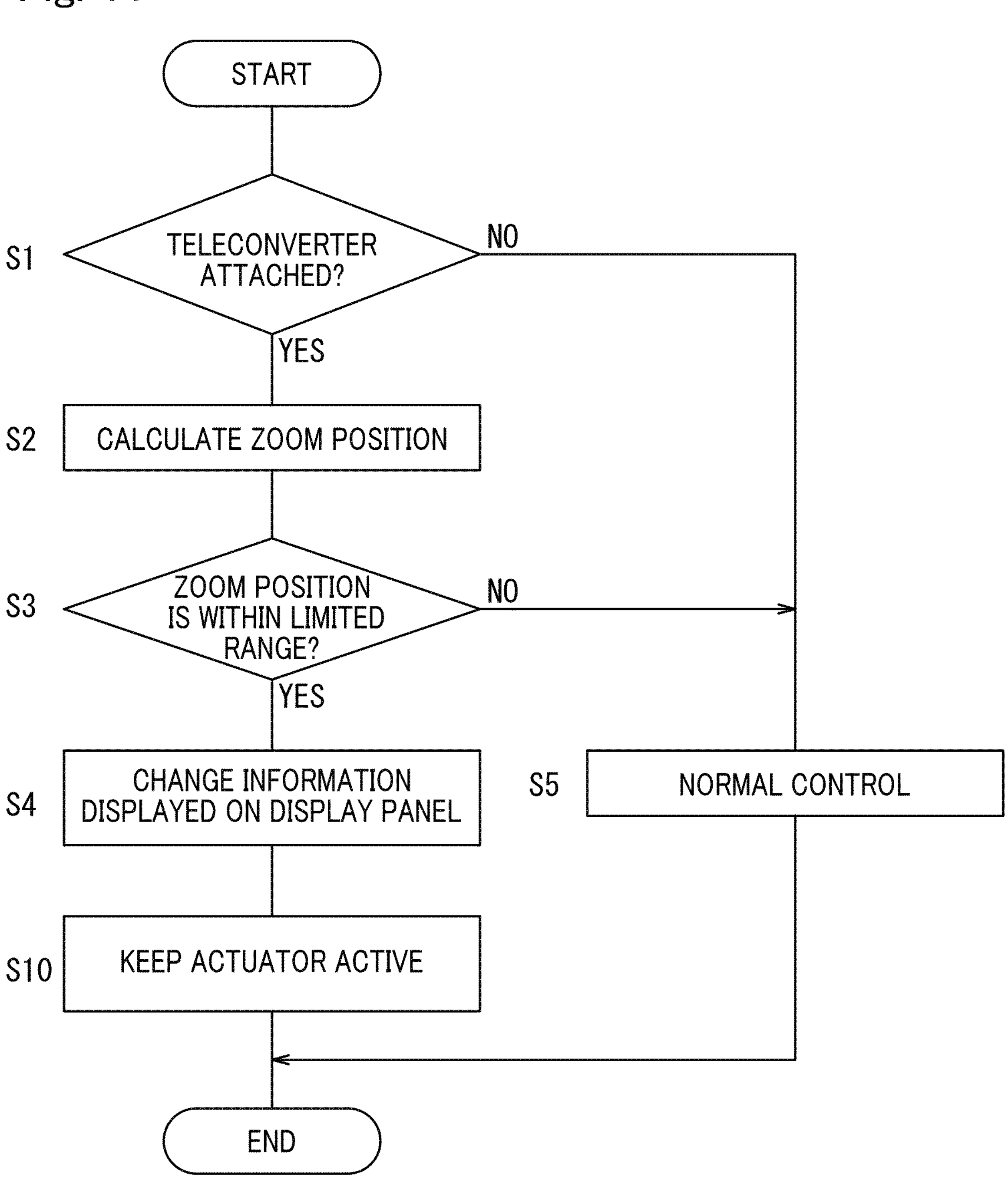
FIG. 11 is a schematic flowchart of a control method of an imaging apparatus according to a fifth embodiment of the present disclosure.

FIG. 11 is a schematic flowchart of a method for controlling the imaging apparatus 1 according to a fifth embodiment of the present disclosure.

The fifth embodiment differs from the first embodiment in that the actuator 43 is kept active when the zoom position is within the limited range.

In FIG. 11, steps S1 to S5 are the same as those in the first embodiment, and therefore detailed description thereof will be omitted.

As shown in FIG. 11, if it is determined at step S3 that the zoom position is within the limited range, step S10 keeps the actuator 43 active.

For example, the second processor 36 continues to apply a drive voltage sufficient to keep the actuator 43 active.

In this manner, when the zoom position is within the limited range, the actuator 43 that drives the aperture 40, the camera-shake correction mechanism 41, and the focus mechanism 42 is kept active.

Effects

The imaging apparatus 1 according to the fifth embodiment of the present disclosure can achieve the following effects.

The instructions stored in the memories 14 and 37 of the imaging apparatus 1 of the present disclosure include keeping the actuator 43 active when the zoom position is within the limited range (S10). With this configuration, when the zoom position is within the limited range that does not guarantee optical performance, the actuator 43 is kept active so that settings during image capturing, such as the settings of the aperture 40, the camera-shake correction mechanism 41, and the focus mechanism 42, can be maintained.

Variant

Figure 12:
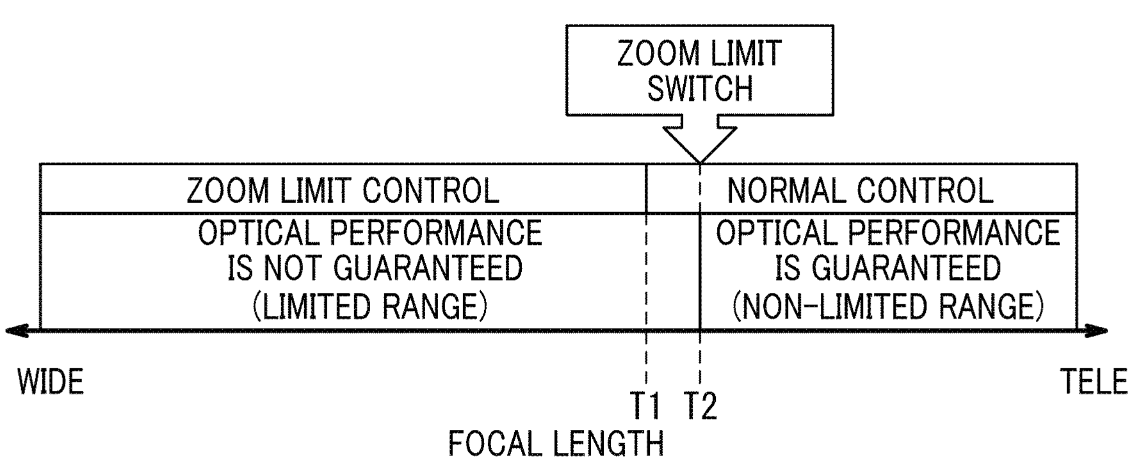
FIG. 12 is a diagrammatic view showing an example of a control range in an imaging apparatus according to a sixth embodiment of the present disclosure.

FIG. 12 is a diagrammatic view showing an exemplary control range in the imaging apparatus 1 of a variant.

As shown in FIG. 12, the first limit position T1 at which the zoom limit control starts may be closer to the WIDE end than the second limit position T2 at which the zoom limit switch 34 restricts the rotation of the zoom ring 32.

Because the zoom limit switch 34 is a mechanical switch, there is variation in the position at which the zoom limit switch 34 restricts the rotation of the zoom ring 32. By positioning the first limit position T1, at which the zoom limit control starts, closer to the WIDE end than the second limit position T2, information displayed on the display panel 12 can be prevented from switching before the rotation of the zoom ring 32 is restricted by the zoom limit switch 34.

As above, the above embodiments have been described as exemplification of techniques in the present disclosure. To that end, the drawings and the detailed description have been provided. Accordingly, the constituent elements described in the accompanying drawings and the detailed description may encompass not only constituent elements essential for solving the problems but also constituent elements not essential for solving the problems, for the purpose of exemplifying the above techniques. Hence, those not-essential constituent elements should not be construed as essential directly from the fact that they are described in the accompanying drawings and the detailed description.

Since the above embodiments are for the purpose of exemplifying the techniques in the present disclosure, various changes, permutations, additions, omissions, etc. may be made within the scope of claims or their equivalents.

The above embodiments may be implemented by apparatuses, systems, methods, computer programs, computer-readable storage media, and combinations thereof.

SUMMARY OF EMBODIMENTS (1) An imaging apparatus of the present disclosure is an imaging apparatus to which an interchangeable lens is attachable via a teleconverter, comprising: a processor; a memory storing instructions to be executed by the processor; a camera body including an imaging element and a display panel; and an interchangeable lens including a lens, a zoom ring that varies position of the lens, and a zoom encoder that detects information on zoom position of the zoom ring; the instructions including: determining whether the teleconverter is attached to the interchangeable lens; calculating the zoom position based on information detected by the zoom encoder; determining whether the zoom position is within a limited range in which optical performance deteriorates if the teleconverter is attached to the interchangeable lens; and changing information displayed on the display panel if the zoom position is within the limited range.

(2) In the imaging apparatus of (1), changing the information displayed on the display panel may include displaying a message on the display panel.

(3) In the imaging apparatus of (1) or (2), changing the information displayed on the display panel may include changing image information displayed on the display panel being captured by the imaging element to other display information.

(4) In the imaging apparatus of any one of (1) to (3), the instructions may further include: detecting that the zoom position has moved from the limited range to a non-limited range in which focal length adjustment is not hindered by the teleconverter; and displaying information captured by the imaging element on the display panel if the zoom position has moved to the non-limited range.

(5) In the imaging apparatus of any one of (1) to (4), the instructions may further include: detecting whether a video is being recorded by the imaging element; and stopping recording of the video if the video is being recorded.

(6) In the imaging apparatus of (5), the instructions may further include: detecting that the zoom position has moved from the limited range to a non-limited range in which focal length adjustment is not inhibited by the teleconverter; and resuming recording of the video if the zoom position has moved to the non-limited range.

(7) In the imaging apparatus of any one of (1) to (6), the instructions may further include: detecting whether a video is being recorded by the imaging element; and changing image information being captured by the imaging element and recording the video if the video is being recorded.

(8) In the imaging apparatus of (7), the recording the video may include changing the image information being captured by the imaging element to other image information and recording the video.

(9) In the imaging apparatus of (7) or (8), the recording the video may include recording the video with a message inserted therein.

(10) In the imaging apparatus of any one of (1) to (9), the instructions may further include: acquiring information of the teleconverter; and determining the limited range based on the information of the teleconverter.

(11) In the imaging apparatus of any one of (1) to (10), the interchangeable lens may further include one or more actuators that drive the interchangeable lens, and the instructions may further include stopping drive voltage applied to the one or more actuators if the zoom position is within the limited range.

(12) In the imaging apparatus of any one of (1) to (10), the interchangeable lens may further include one or more actuators that drive the interchangeable lens, and the instructions may further include keeping the one or more actuators active if the zoom position is within the limited range.

(13) In the imaging apparatus of any one of (1) to (12), the limited range may be a range from a Wide end to a first limit position, and the first limit position may be determined based on lens focal length of the interchangeable lens and magnification of the teleconverter.

(14) In the imaging apparatus of any one of (1) to (13), the interchangeable lens may further include a zoom limit switch capable of limiting the zoom position to a range from a Tele end to a second limit position, and the first limit position may be closer to the Wide end than the second limit position.

(15) In the imaging apparatus of any one of (1) to (14), the interchangeable lens is configured to retract the lens to avoid interference between the lens and the teleconverter.

(16) In the imaging apparatus of (15), the limited range is a range that the focal length adjustment is inhibited by retracting the lens.

(17) A method for controlling an imaging apparatus of the present disclosure is a control method of an imaging apparatus executed by a processor, wherein the imaging apparatus is an imaging apparatus to which an interchangeable lens is attachable via a teleconverter, the imaging apparatus comprising: a camera body including an imaging element and a display panel; and the interchangeable lens including a lens, a zoom ring that varies position of the lens, and a zoom encoder that detects information on zoom position of the zoom ring, the method comprising: determining whether the teleconverter is attached to the interchangeable lens; calculating the zoom position based on information detected by the zoom encoder; determining whether the zoom position is within a limited range in which optical performance deteriorates if the teleconverter is attached to the interchangeable lens; and changing information displayed on the display panel if the zoom position is within the limited range.

(18) In the method of (17), wherein changing the information displayed on the display panel may include displaying a message on the display panel.

(19) The method of (17) or (18) may further include: detecting that the zoom position has moved from the limited range to a non-limited range in which focal length adjustment is not hindered by the teleconverter; and displaying information captured by the imaging element on the display panel if the zoom position has moved to the non-limited range.

(20) A computer-readable storage medium of the present disclosure stores a program for causing a processor to execute the control method of any one of (17) to (19).

What is claimed is:

1. An imaging apparatus to which an interchangeable lens is attachable via a teleconverter, comprising:
- a processor;
- a memory storing instructions to be executed by the processor;
- a camera body including an imaging element and a display panel; and
- an interchangeable lens including a lens, a zoom ring that varies position of the lens, and a zoom encoder that detects information on zoom position of the zoom ring;
- the instructions including:
- determining whether the teleconverter is attached to the interchangeable lens;
- calculating the zoom position based on information detected by the zoom encoder;
- determining whether the zoom position is within a limited range in which optical performance deteriorates if the teleconverter is attached to the interchangeable lens; and
- changing information displayed on the display panel if the zoom position is within the limited range.

2. The imaging apparatus according to claim 1, wherein changing the information displayed on the display panel includes displaying a message on the display panel.

3. The imaging apparatus according to claim 2, wherein changing the information displayed on the display panel includes changing image information displayed on the display panel being captured by the imaging element to other display information.

4. The imaging apparatus according to claim 1, wherein the instructions further include:
- detecting that the zoom position has moved from the limited range to a non-limited range in which focal length adjustment is not hindered by the teleconverter; and
- displaying information captured by the imaging element on the display panel if the zoom position has moved to the non-limited range.

5. The imaging apparatus according to claim 1, wherein the instructions further include:
- detecting whether a video is being recorded by the imaging element; and
- stopping recording of the video if the video is being recorded.

6. The imaging apparatus according to claim 5, wherein the instructions further include:
- detecting that the zoom position has moved from the limited range to a non-limited range in which focal length adjustment is not inhibited by the teleconverter; and
- resuming recording of the video if the zoom position has moved to the non-limited range.

7. The imaging apparatus according to claim 1, wherein the instructions further include:
- detecting whether a video is being recorded by the imaging element; and
- changing image information being captured by the imaging element and recording the video if the video is being recorded.

8. The imaging apparatus according to claim 7, wherein the recording the video includes changing the image information being captured by the imaging element to other image information and recording the video.

9. The imaging apparatus according to claim 7, wherein the recording the video includes recording the video with a message inserted therein.

10. The imaging apparatus according to claim 1, wherein the instructions further include:
- acquiring information of the teleconverter; and
- determining the limited range based on the information of the teleconverter.

11. The imaging apparatus according to claim 1, wherein the interchangeable lens further includes one or more actuators that drive the interchangeable lens, and wherein
- the instructions further include stopping drive voltage applied to the one or more actuators if the zoom position is within the limited range.

12. The imaging apparatus according to claim 1, wherein the interchangeable lens further includes one or more actuators that drive the interchangeable lens, and wherein
- the instructions further include keeping the one or more actuators active if the zoom position is within the limited range.

13. The imaging apparatus according to claim 1, wherein the limited range is a range from a Wide end to a first limit position, and wherein
- the first limit position is determined based on lens focal length of the interchangeable lens and magnification of the teleconverter.

14. The imaging apparatus according to claim 13, wherein the interchangeable lens further includes a zoom limit switch capable of limiting the zoom position to a range from a Tele end to a second limit position, and wherein
- the first limit position is closer to the Wide end than the second limit position.

15. The imaging apparatus according to claim 1, wherein the interchangeable lens is configured to retract the lens to avoid interference between the lens and the teleconverter.

16. The imaging apparatus according to claim 15, wherein the limited range is a range that the focal length adjustment is inhibited by retracting the lens.

17. A method for controlling an imaging apparatus executed by a processor, wherein the imaging apparatus is an imaging apparatus to which an interchangeable lens is attachable via a teleconverter, the imaging apparatus comprising:

a camera body including an imaging element and a display panel; and the interchangeable lens including a lens, a zoom ring that varies position of the lens, and a zoom encoder that detects information on zoom position of the zoom ring, the method comprising:

determining whether the teleconverter is attached to the interchangeable lens;

calculating the zoom position based on information detected by the zoom encoder;

determining whether the zoom position is within a limited range in which optical performance deteriorates if the teleconverter is attached to the interchangeable lens; and changing information displayed on the display panel if the zoom position is within the limited range.

18. The method according to claim 17, wherein changing the information displayed on the display panel includes displaying a message on the display panel.

19. The method according to claim 17, further comprising:

detecting that the zoom position has moved from the limited range to a non-limited range in which focal length adjustment is not hindered by the teleconverter; and displaying information captured by the imaging element on the display panel if the zoom position has moved to the non-limited range.

20. A non-transitory computer-readable storage medium storing a program for causing a processor to execute the control method according to claim 17.

* * * * *